United States Patent [19]

Onesti

[11] Patent Number: 4,862,365
[45] Date of Patent: Aug. 29, 1989

[54] UNIVERSAL ELECTROMECHANICAL GAUGE

[75] Inventor: Robert J. Onesti, Ft. Wayne, Ind.

[73] Assignee: Navistar International Transportion Corp., Chicago, Ill.

[21] Appl. No.: 136,223

[22] Filed: Dec. 21, 1987

[51] Int. Cl.⁴ .............................................. G06F 3/14
[52] U.S. Cl. ............................. 364/424.01; 364/556; 340/459
[58] Field of Search .............. 364/424, 431.12, 431.04, 364/424.04, 424.01; 340/870.19, 459; 360/200, 900, 550, 556

[56] References Cited

U.S. PATENT DOCUMENTS

| | | | |
|---|---|---|---|
| 4,236,213 | 11/1980 | Richardson | 364/431.04 |
| 4,291,382 | 9/1981 | Full et al. | 364/551 |
| 4,302,814 | 11/1981 | Full et al. | 364/551 |
| 4,309,759 | 1/1982 | Tokuda et al. | 364/431.12 |
| 4,395,624 | 7/1983 | Wartski | 364/424.04 |
| 4,404,648 | 9/1983 | Miyakawa et al. | 364/424 |
| 4,507,706 | 3/1985 | Trexler, Jr. | 361/331 |
| 4,551,801 | 11/1985 | Sokol | 364/424 |
| 4,562,545 | 12/1985 | Nasegawa | 364/431.12 |
| 4,611,193 | 9/1986 | Bruggemann | 340/52 F |
| 4,630,043 | 12/1986 | Haubner et al. | 340/825.57 |
| 4,635,034 | 1/1987 | Tokuyama et al. | 340/52 F |
| 4,646,059 | 2/1987 | Iwamoto et al. | 340/52 C |
| 4,713,762 | 12/1987 | Igarashi | 364/424.01 |
| 4,725,838 | 2/1988 | Maschek et al. | 340/870.19 |

*Primary Examiner*—Parshotam S. Lall
*Assistant Examiner*—V. Trans
*Attorney, Agent, or Firm*—F. David AuBuchon; Dennis K. Sullivan

[57] ABSTRACT

An electrical instrumentation system comprises plural sensors that provide data signals representing values of parameters of interest to a CPU that in turn presents corresponding signals in multi-bit forms to corresponding indicator gauges. Each indicator gauge comprises a latching memory circuit in which the multi-bit data received from the CPU is latched, a free-running counting circuit, and a comparator circuit that compares the counting of the free-running counting circuit to the data in the latching memory circuit. The counter repeatedly counts from an initial to a final value, and when the comparator detects coincidence of the count to the latched data during each such counting interval, it switches the state of a bi-stable circuit. The bi-stable circuit assumes one state during the portion of each counting interval preceding the coincidence detection, and the other state during the portion of each interval succeeding the coincidence detection. The bi-stable circuit produces a pulse width modulation of the electromechanical movement of the gauge to cause the gauge to indicate the value of the latched data, and hence, the value of the corresponding parameter. Each gauge does not require the continuous attendance of the CPU thereby freeing the CPU to perform other tasks during times that it is not updating the latched data in the gauge.

23 Claims, 3 Drawing Sheets

UNIVERSAL ELECTROMECHANICAL GAUGE

This invention relates generally to an indicator gauge that is used in an electrical instrumentation system to provide an indication of the value of a parameter that is monitored by an associated sensor. Gauges of this general type are commonly used in instrument clusters of automotive vehicles to display the values of various operating parameters that are of interest, such as engine speed, engine oil temperature, engine oil pressure, etc.

More specifically, the invention relates to a gauge that has an electromechanical movement adapted by means of self-contained electronics for use with a microprocessor based system that performs various functions associated with an automotive vehicle, including the functions of monitoring various sensors and providing sensor data to the gauges in the form of multi-bit values.

A typical electromechanical gauge has an air core movement operated by a current whose value is representative of the value of the particular parameter that is to be indicated by the gauge. As the value of the current changes, so does the amount of deflection of the movement, and this produces a corresponding deflection of a needle on the face of the gauge thereby providing the indication of the parameter.

Before the advent of electronic systems, the electric current for the gauge was derived directly from a circuit including the sensor associated with the parameter of interest, such that the current flowing through the gauge was essentially a D.C. one whose magnitude was representative of the value of the parameter of interest.

Even with the advent of electronic systems, such as digital microprocessor-based ones, electromechanical type gauges continue to enjoy substantial usage. In general, such gauges can be mass-produced at considerably lower cost than gauges that have digital displays. Moreover, many people prefer the indication of a needle rather than the presentation of a number.

Sensor information processed in prior digital electronic systems to operate electromechanical gauges, has been used to repeatedly refresh the gauges even though the values of the parameters that are to be displayed may not have changed. Such prior systems have been required to continuously generate a pulse width modulated signal for driving each gauge, and such devoted activity has limited the throughput of the system.

Representative patents reflecting the state of the art as developed by a preliminary novelty search on this invention are: 4,291,382; 4,302,814; 4,404,648; 4,551,801; 4,562,545; 4,611,193; 4,630,043; 4,635,034; 4,646,059.

The present invention provides a meaningful improvement over the prior art by means of a novel and unique combination of circuitry embodied in an electromechanical gauge itself to cause the gauge to indicate the latest value of a multi-bit data value supplied to the gauge from the microprocessor. While the gauge movement is still operated by a pulse width modulated signal, the novel configuration of the self-contained gauge circuitry does not require continuous attendance of the microprocessor; rather, the sensor data need to presented to the gauge only intermittently based on how fast the data is capable of changing. This feature enables the microprocessor to be freed of the requirement for continuously driving the gauges so that it can perform other tasks during the times that it is not supplying data to the gauges. Because of this novel configuration of circuitry associated with an electromechanical gauge, the data supplied to the gauge need be updated in fact, only as changes in that data occur.

A still further advantage is that the basic combination of gauge and circuitry can be used for indicating the values of different parameters, and hence there can be a substantial commonality between individual gauges thereby allowing universal usage for many applications, if desired. For example, by suitable design of an instrument cluster, such a universal gauge can be plugged into any port to display any parameter required. By configuring the combination of microprocessor and various gauges in accordance with a memory-map addressing technique, the microprocessor can operate as many gauges as there are address locations, and each gauge need be updated with sensor data only as required by the nature of the particular parameter that it indicates so that in a multiple gauge system, the individual gauges can be updated at different times and rates.

Moreover, the gauge per se is physically organized and arranged for compactness and for convenient assembly to an instrument cluster. Advantageously an indicator lamp, an LED for example, can be incorporated into the face of the gauge and operatively connected with the self-contained electronics in the gauge to provide an indication whenever sensor data is beyond the range of the indicator needle. While the needle will indicate either full or no deflection in such a situation, depending on whether the sensor data is above or below the range of the gauge, the illumination of the lamp is intended to draw attention to the gauge in such situation. This feature can therefore be considered to augment the basic range of the gauge without modification of the basic gauge movement.

The foregoing features, advantages and benefits of the invention, along with additional ones, will be seen in the ensuing description and claims which should be considered in conjunction with the accompanying drawings. The drawings disclose a presently preferred embodiment of the invention according to the best mode contemplated at the present time in carrying out the invention.

DESCRIPTION OF THE PREFERRED EMBODIMENT

Figure 1:
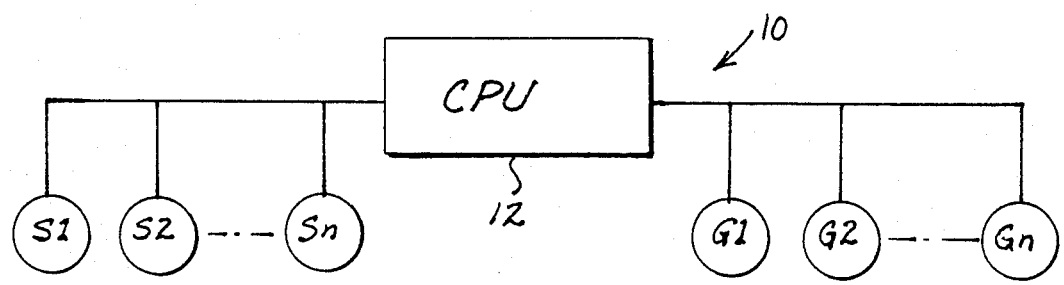
FIG. 1 is a general block diagram of a microprocessor-based instrumentation system embodying principles of the invention.

FIG. 1 portrays an instrumentation system 10 that comprises a number of sensors S1, S2, . . . Sn that provide data signals for respective parameters being measured. These data signals are supplied to a central processing unit (CPU) 12 that contains electronic data processing devices, such as a microprocessor and associated components. CPU 12 presents these data signals to corresponding electromechanical gauges G1, G2, . . . Gn in the form of respective multi-bit values with the result that each gauge's analog movement operates to a position corresponding to the particular value which it receives. Accordingly, the indicating needle, or pointer, attached to the gauge movement indicates on the face of the gauge the value of the parameter measured by the corresponding sensor.

In an automotive vehicle instrument cluster the gauges would present information useful to the vehicle operator, such as engine speed, engine oil temperature, engine oil pressure, coolant temperature, etc. The corresponding sensors would be mounted at appropriate locations on the vehicle and coupled to the CPU by suitable wiring. The CPU would be mounted in an appropriate location, such as inside the cab or body of the vehicle, and coupled in an appropriate manner to the gauges.

The precise manner of interfacing the sensors to the CPU will depend upon the particular types of sensors used. Many sensors are analog type devices and in such a case the CPU will perform an analog to digital (A to D) conversion of each analog signal to develop a correlated multi-bit value for the corresponding gauge. Where a sensor provides digital data, it is still likely that the CPU will have to perform some conversion to develop a correlated multi-bit value for the corresponding gauge.

A gauge that embodies principles of the invention does not rely on the particular details of how the multi-bit value that is presented to it is developed. Rather, the significant point is that the electromechanical movement of the gauge does not have to be continuously driven by the CPU, consequently reducing the amount of time that the gauge must allocate to this task. This then frees the CPU to perform other duties, thereby improving the CPU's efficiency. With this background in mind, the reader's attention is directed to the detailed schematic diagram of a preferred exemplary embodiment of gauge that appears in FIG. 2.

Briefly, the exemplary gauge comprises: a multi-bit latching memory circuit U1; a digital comparator circuit U2; a multi-bit counting circuit U3A, U3B; a local clock circuit U7A, U7B, U7C, U5A with associated resistors R4, R5, R6, R7 and capacitor C3; a bi-stable circuit U5B with associated inverter U7D and resistor R1; and a transistor circuit for operating the electromechanical movement M of the gauge, said transistor circuit comprising an NPN transistor Q1 with associated resistors R2, R3, R9 and capacitor C1 connected as illustrated.

The voltage for the gauge is identified by the positive D.C. potential +Vcc, as referenced to ground, and is delivered to the gauge from a power supply that is external to the gauge. For example, the power supply may be one of the devices that is associated with the CPU and develops from the vehicle's power supply, suitable regulated voltage, or voltages, for the various electronic and electrical devices. A filter capacitor C2 in the gauge is across the D.C. voltage that is supplied to the gauge.

Figure 2:
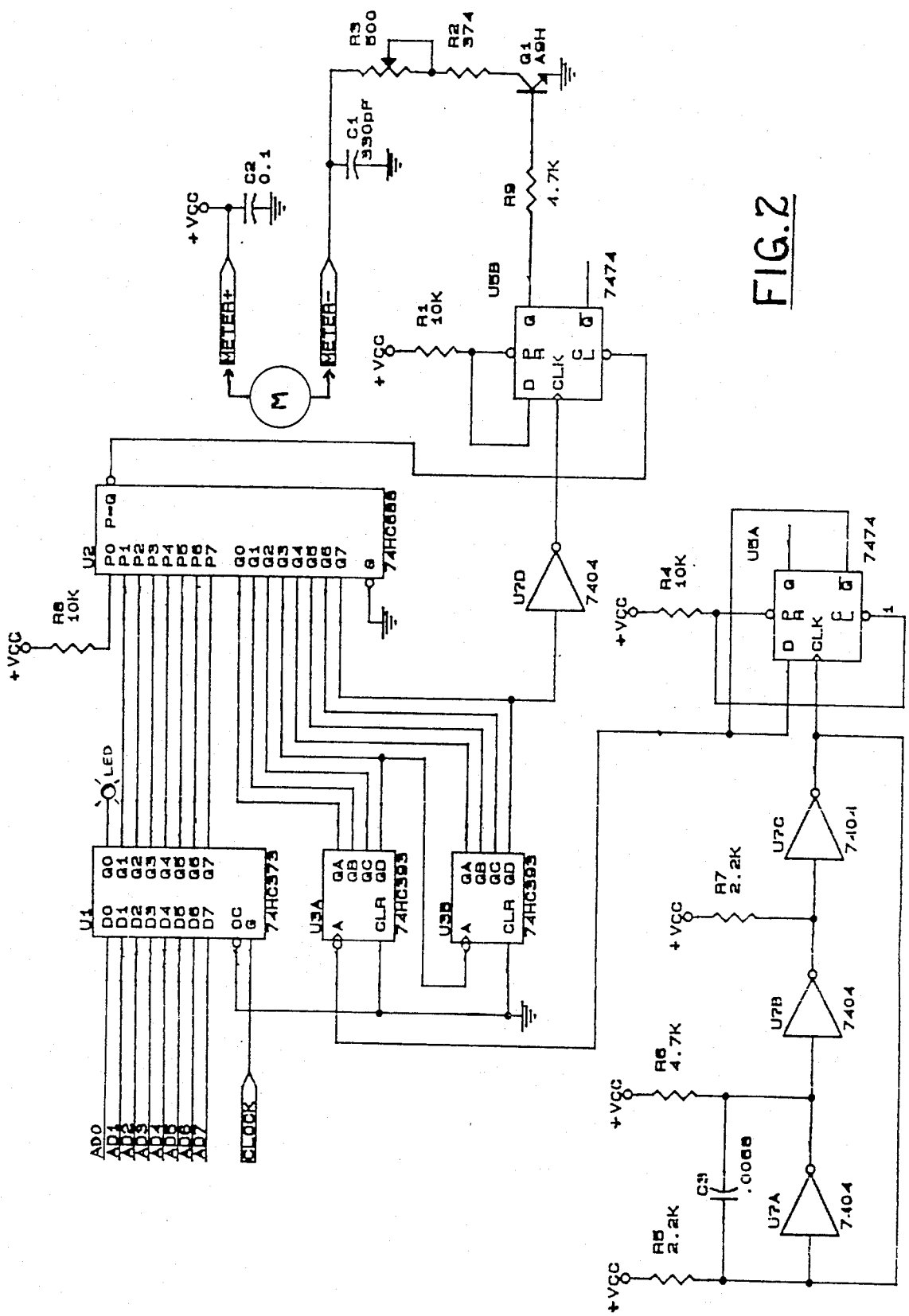
FIG. 2 is a detailed electrical schematic diagram of an instrument gauge that is used in the system of FIG. 1 and embodies principles of the invention.

In a given instrument cluster configuration that contains multiple gauges, each gauge is assigned a particular location that is uniquely addressed by the CPU to present data to the gauge. When a particular gauge is so addressed by this memory-mapping technique, the multi-bit value is presented to the multi-bit latching memory circuit U1 and latched in it. FIG. 2 portrays a parallel data transmission configuration where eight bits of data are presented to circuit U1 via lines AD0, AD1, AD2, AD3, AD4, AD5, AD6, and AD7, and latched in circuit U1 in response to an external clock pulse from the CPU. Once the data has been latched in circuit U1, the CPU is freed to perform other tasks until such time as the data to the gauge should be updated. Thus, the gauge does not require the full time attention of the CPU.

The data bits that are latched in circuit U1 continuously appear at the outputs Q0, Q1, Q2, Q3, Q4, Q5, Q6, and Q7. An eight bit format for sensor data is potentially capable of providing 256 unique positions for the gauge movement. In the case of typical automotive type gauges, this degree of resolution will almost invariably be more than enough, and so the configuration of FIG. 2 illustrates use of the seven most significant bits of sensor data (AD1-AD7) to operate the gauge movement. Hence, these seven bits are latched in circuit U1 to appear at outputs Q1 through Q7, which in turn connect to inputs P1 through P7 of comparator circuit U2. Output Q0 of U1 is also utilized in response to the data bit at input AD0, but in a novel way that will be explained later after completion of the description of how the gauge movement is operated by the circuitry.

The local clock circuit is configured to be free running at an appropriate frequency to deliver clock pulses at a uniform rate to terminal A of U3A of the multi-bit counting circuit U3A, U3B. The two circuits U3A, U3B are connected to form an eight bit counting circuit that continuously counts these clock pulses. Hence, the counting circuit repeatedly and continuously counts up in unit increments from zero to 255. The instantaneous eight bit count is provided to the inputs Q0 through Q7 of comparator circuit U2.

Comparator circuit U2 functions to compare the count from counter U3A, U3B, as received at U2's inputs Q0 through Q7, with the seven most significant bits of the sensor data value latched in circuit U1, as received at U2's inputs P1 through P7. The least significant input P0 is pulled up to +Vcc through a resistor R8. When circuit U2 detects equality of the value at its inputs Q0 through Q7 with the value at its inputs P0 through P7, it gives an indication at its P=Q output.

The counting cycle for circuit U3A, U3B may be considered to begin at zero. Therefore, the larger the value latched in circuit U1, the longer it will take the circuit U2 to indicate P=Q equality during each counting cycle. Thus the division of each counting cycle into two parts, one part being that portion which precedes the attainment of equality, and the other part being that portion which succeeds the attainment of equality, can be used to generate a pulse width modulated signal for driving the gauge movement. The circuit of FIG. 2 is further configured to provide this modulation in the following way.

When the count from counting circuit U3A, U3B goes from 255 to zero, the most significant bit, QD of U3B, goes from high to low. This change is transmitted through inverted U7D to cause circuit U5B to be clocked. Circuit U5B is a D-type flip-flop, and since the D terminal is pulled up to +Vcc through resistor R1, the clocking from inverter U7D causes the Q output of U5B to go high, if it is not already so. The Clear terminal Cl of U5B is connected to the P=Q output of circuit U2 so that when the latter detects coincidence of the count to the latched sensor data. The Q output of U5B is forced low. Hence, the time during each 256 count counting cycle that the Q output of U5B is high corresponds to the value of the data in circuit U1.

The Q output of U5B connects through resistor R9 to the base of transistor Q1. When the Q output of U5B is high, transistor Q1 is conductive, and when the Q output of U5B is low, transistor Q1 is non-conductive. Hence, a pulse width modulated rectangular waveform is impressed across the movement M of the gauge by the on-off modulation of transistor Q1. This causes the movement to assume a position corresponding to the pulse width, and correspondingly, the needle N that is disposed on the face of the gauge and affixed to the movement, indicates the value of the data in latch circuit U1. Resistors R2, R3 serve to calibrate the gauge by setting the peak amplitude of the pulse width modulated current flow to the movement to the appropriate value so that readings on the face of the gauge correspond to the values in the latch circuit.

Figure 3:
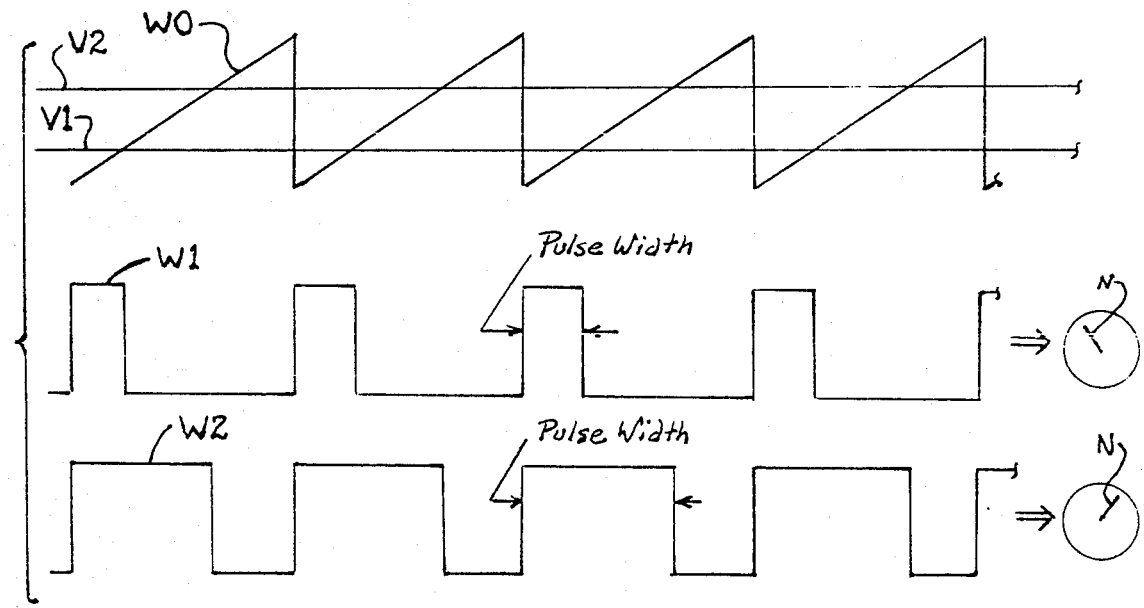
FIG. 3 is a series of representative waveforms useful in explaining operation of the system and gauge.

FIG. 3 illustrates a series of representative schematic waveforms useful in explaining the operation of the circuit of FIG. 2. The sawtooth waveform W0 represents the counting of circuit U3A, U3B. The waveform is seen as a succession of straight lines that rise from the initial zero value to the 255 count final value, and then return to zero. Although the lines that represent the ascending count appear in the drawing as completely linear, each one would appear on a magnified scale as a staircase waveform because of the digital counting in discrete bits.

The signal V1 represents one particular value in latch circuit U1, and the waveform W1 represents the pulse width modulated signal that operates the gauge movement for that value. The signal V2 represents another, and larger, value in latch circuit U1, and the waveform W2 represents the pulse width modulated signal that operates the gauge movement for this larger value. It can be seen that the average value of waveform W2 is correspondingly larger than that of waveform W1, and hence waveform W2 produces a correspondingly greater deflection of needle N than does waveform W1.

Figure 4:
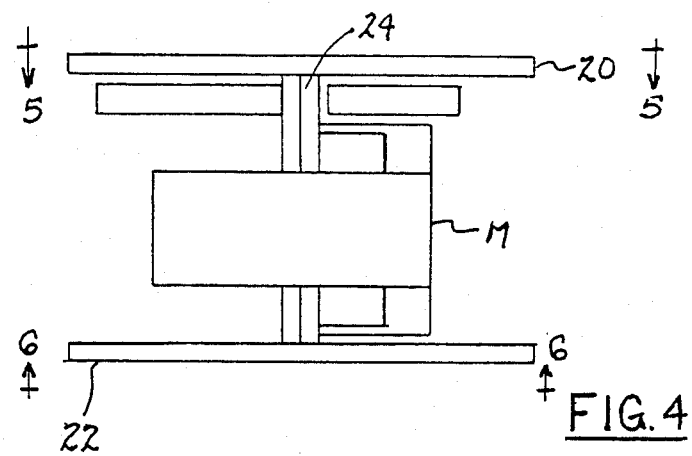
FIG. 4 is a radial view of a gauge embodying principles of the invention.
Figure 5:
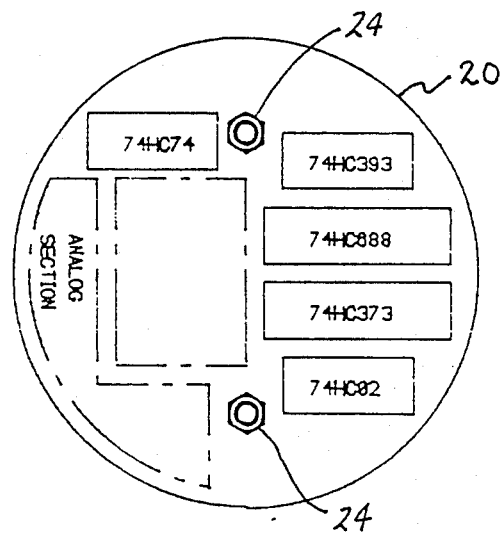
FIG. 5 is a view taken in the direction of arrows 5—5 in FIG. 4.
Figure 6:
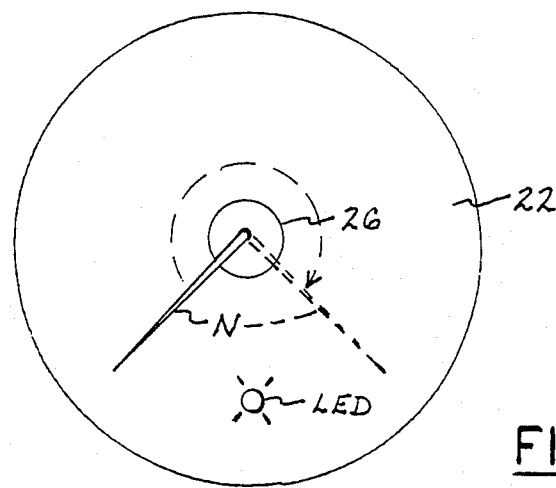
FIG. 6 is a view taken in the direction of arrows 6—6 in FIG. 4.

FIGS. 4-6 illustrate certain details of a physical embodiment of a gauge mechanism. It has a circular printed circuit board 20 at the back and a circular front panel 22 at the front that are securely joined in spaced apart alignment by suitable joining structure 24. The movement M is disposed between the circuit board and front panel. The needle N is disposed to the front side of panel 22 and suitably affixed to the output of movement M by passing through a hole 26 in the center of the front panel.

Circuit board 20 serves to mount and electrically connect the components that form the circuitry shown in FIG. 2. The analog section contains principally the transistor circuit that drives the gauge movement, and there are appropriate conductors from that circuit to the movement.

The specific details for mounting a gauge in association with system 10 will obviously depend on the specific details of the design. The illustrated gauge is designed as a universal gauge for a system that is designed with multiple identical gauge ports each identified by a unique address. The same gauge mechanism can be used in any of these ports, thereby enhancing the commonality of parts in a multiple gauge instrumentation system. To the extent that the parameter indicated by a gauge must be uniquely identified on the face of the gauge, that could be done by a separate overlying transparent cover that contains the parameter identification and/or an appropriate graduation against which the needle can be read. Alternatively, the incorporation of such indicia on the face of front panel 22 will still result in substantial commonality of parts in multiple gauges. Gauge installation and removal is facilitated by designing them for plug-in type connection to a port. Such plug-in accommodations would include channels for the sensor data, the addressing, and the clocking from the microprocessor, along with suitable power supply connections.

In designing the circuitry of FIG. 2, one must recognize that the frequency of waveform W0, i.e. duration of the counting cycle, has an effect on how fast new data latched into circuit U1 can be reflected by the gauge movement, but this will be essentially inconsequential provided that the frequency is high enough. On the other hand, the frequency must not be so high as to exceed the bandwidth of the movement, i.e. not prevent the movement from responding. Specific designs will take these considerations into account.

Because the latest data to the gauge remains latched in circuit U1, there is no need to update the data until such time as the data changes. The rate at which data changes depends upon the particular parameter being measured. The maximum rate of change of one parameter, engine speed for example, often will exceed the maximum rate of change of another parameter, engine oil temperature for example. In order for a gauge to follow the maximum rate of change as faithfully as possible, the frequency of waveform W0 must be sufficiently high and the gauge movement must have a sufficiently large bandwidth. Present technology relating to electronics and gauge movements is adequate to attain compliance with these requirements so that gauges embodying principles of this invention can be used for rapidly changing parameters such as speed, as well as for slower changing ones such as temperature.

Now that the operation of the gauge movement by the electronic circuitry has been described, attention is re-directed to FIG. 2 to explain the use of the Q0 output of latching memory circuit U1. It will be remembered that this output represent one bit of data that is received from the CPU but not passed on to comparator circuit U2. Where the sensor that operates a particular gauge has a sensing span that exceeds the span of the gauge movement, the AD0 data input can be used to provide an indication whenever the actual sensor signal is outside the movement's span. To this end, the CPU may be configured to compare the actual sensor signal to the known range of signals that will produce a gauge indication lying within the span of the movement. If the sensor signal happens to be outside the movement's span, either above the upper limit or below the lower limit, then the CPU gives a signal via AD0 that causes the output Q0 to be latched high so long as the sensor signal remains outside the span.

The particular circuit device for circuit U1 has sufficient output capacity to drive an LED, and so by connecting an LED as in FIG. 2, it will illuminate whenever the CPU shows the sensor signal to be outside the limits of the gauge movement. By placing the LED on the face of the gauge as shown in FIG. 6 and suitable connections back to circuit board 20, the illumination of the LED will serve to draw the operator's attention to the particular gauge. The operator can then see whether the needle is pointing to the high or low end of its range and from that observation will know whether the parameter being monitored is overly high or underly low. FIG. 6 shows a suitable organization and arrangement of a representative gauge in which the movement has a span of approximately 270 degrees, from about 7:30 o'clock to about 4:30 o'clock, and the LED is located at 6:00 o'clock.

Various modifications may be made to the gauge circuit while retaining the inventive principles. The example of FIG. 2 develops an indication that varies directly with the value of the latched data, in other words, the larger the value of the data, the larger the deflection of the gauge movement. A gauge that has an inverse characteristic, i.e. decreasing deflection with increasing value of latched data, can be created in different ways, one way being by inverting the pulse width modulated signal. Non-linearities in a sensor and/or a gauge movement can be compensated by suitably programming the CPU to yield substantial linearity. The circuit could be configured to accept serially transmitted data instead of the parallel transmission shown and described in FIG. 2.

The example of FIG. 2 uses a count-up-from-zero counting circuit and looks for the count to attain coincidence with the latched data value. There are other equivalent circuit configurations for performing equivalent functions, and one example would be an up/down counting circuit with parallel load capability that would replace the counting circuit and comparator circuit in FIG. 2.

The circuit can also be modified to produce automatic illumination of the LED without having the CPU perform a comparison of sensor data to the known span of the movement. Such automatic illumination is accomplished by using for the comparison, a lesser number of bits than the bit capacity of the latching memory. In this way, a data value that exceeds the capacity of the memory will latch one of the bits of the latching memory that is not used for the usual comparison, and this latched bit will directly illuminate the LED.

The generic part number identifications of the various circuit devices and the values of resistors and capacitors for the specific circuit of FIG. 2 are shown on that Fig. Unless otherwise specified, all resistance values are shown in ohms, all capacitance values in microfarads, and all resistors are ¼ watt, 10%.

Therefore, while a preferred embodiment of the invention has been illustrated and described, it is to be appreciated that principles are applicable to other embodiments.

What is claimed is:

1. In an instrumentation system in which a sensor that monitors the value of a parameter of interest presents to a central processing unit (CPU) a data signal representing the value of the parameter of interest, the CPU presents to an indicator gauge that has an electromechanical movement a multi-bit value that correlates to the value of the data signal, and hence to the value of the parameter of interest, and the electromechanical movement of the gauge is operated in response to said multi-bit value to thereby cause the gauge to display movement as a function of said multi-bit value, and hence to indicate the value of the parameter of interest, the improvement comprising said CPU intermittently presenting said multi-bit value to said gauge, and said gauge comprising:

a. a multi-bit latching memory circuit in which the latest multi-bit value received by the gauge from the CPU is latched;

b. timing circuit means for periodically generating a basic time interval comprising a multi-bit counting circuit;

c. correlating circuit means having inputs connected to said multi-bit latching memory circuit and to said timing circuit means and comprising means for correlating the multi-bit value latched in said latching memory circuit to the counting by said multi-bit counting circuit during each basic time interval, said correlating circuit means having an output; and d. modulating circuit means having an input connected to the output of said correlating circuit means and comprising means for modulating a circuit that operates said movement of said gauge in accordance with the occurrence of a predetermined correlation, as determined by said correlating circuit means, of the multi-bit value latched in said multi-bit latching memory circuit to the counting of said counting circuit during each basic time interval to cause the gauge to display movement as a function of the multi-bit value latched in said multi-bit latching memory circuit.

2. The improvement set forth in claim 1 in which said gauge further comprises an indicator that is independent of said movement and operated by a particular bit of said multi-bit latching memory circuit to give an indication that the value of the parameter of interest, as sensed by said sensor, is outside the span of said movement.

3. The improvement set forth in claim 1 which there are plural such sensors and plural such gauges, and each gauge is updated by the CPU at rates and times that are particular to the particular parameter that is measured by the corresponding sensor.

4. The improvement set forth in claim 1 in which said multi-bit counting circuit is a free-running counting circuit that counts from an initial count to a final count during each basic time interval, and said correlating circuit means comprises comparison means for comparing the multi-bit value latched in said multi-bit latching memory circuit to the value of the count of said free-running counting circuit.

5. The improvement set forth in claim 4 in which said modulating circuit means comprises pulse width modulating means for applying to said circuit that operates said movement, a pulse width modulated voltage whose pulse width is determined by the occurrence of said predetermined correlation of the multi-bit value latched in said latching memory circuit to the counting of said free-running counting circuit.

6. The improvement set forth in claim 5 in which said free-running counting circuit presents its counting as a multi-bit value, and said comparison means comprises a multi-bit comparator circuit for comparing the multi-bit value latched in said multi-bit latching memory circuit to multi-bit value of the counting of said free-running counting circuit, the occurrence of said predetermined correlation resulting from coincidence of the multi-bit value of said free-running counting circuit with the multi-bit value latched in said multi-bit latching memory circuit.

7. The improvement set forth in claim 6 in which said pulse width modulating means comprises a bi-stable circuit that is operated to one stable state substantially at the time that said free-running counting circuit begins to count from said initial count and that is operated to the other stable state upon coincidence of the multi-bit value of said free-running counting circuit to the multi-bit value latched in said latching memory circuit.

8. The improvement set forth in claim 1 in which said correlating circuit means comprises means for comparing the count of said counting circuit to the multi-bit value latched in said latching memory circuit during each basic time interval, and said modulating circuit means comprises a bi-stable circuit that is operated during each basic time interval to one stable state during a portion of such interval prior to the occurrence of said predetermined correlation of the multi-bit value latched in said latching memory circuit to the counting of said counting circuit and to the other stable state during a portion of such interval subsequent to the occurrence of said predetermined correlation.

9. The improvement set forth in claim 8 in which said bi-stable circuit is coupled to said circuit that operates said movement of said gauge for applying to said circuit that operates said movement of said gauge a pulse width modulated voltage whose on and off times are established by the respective portions of the basic time interval prior and subsequent to the occurrence of said predetermined correlation.

10. The improvement set forth in claim 9 in which the on time of the pulse width modulated voltage is set by the portion of the basic time interval prior to the occurrence of said predetermined correlation and the off time by the portion of the basic time interval subsequent to the occurrence of said predetermined correlation.

11. The improvement set forth in claim 9 in which said multi-bit counting circuit is free-running counting circuit that serves to define the basic time interval as the time required to count from an initial count to a final count and with each immediately succeeding basic time interval beginning by said free-running counting circuit reverting to its initial count on the count immediately following the final count of the immediately preceding interval.

12. An indicator gauge for use in an instrumentation system in which a central processing unit (CPU) intermittently presents to the gauge multi-bit data whose value is to be indicated by the gauge, said gauge comprising:
   a. an electromechanical movement that is operated to cause the gauge to give an indication of the value of the data that is presented to the gauge by the CPU;
   b. a multi-bit latching memory circuit in which the latest value of said multi-bit data received by the gauge from the CPU is latched;
   c. timing circuit means for periodically generating a basic time interval comprising a multi-bit counting circuit;
   d. correlating circuit means having inputs connected to said multi-bit latching memory circuit and to said timing circuit means and comprising means for correlating the value of the multi-bit data latched in said latching memory circuit to the counting by said multi-bit counting circuit during each basic time interval, said correlating circuit means having an output; and
   e. means for operating said movement comprising modulating circuit means having an input connected to the output of said correlating circuit means and comprising means for modulating current to said circuit that operates said movement in accordance with the occurrence of a predetermined correlation, as determined by said correlating circuit means, of the multi-bit value latched in said multi-bit latching memory circuit to the counting of said counting circuit during each basic time interval to cause the gauge to display movement as a function of the latest value of the multi-bit data latched in said multi-bit latching memory circuit.

13. The improvement set forth in claim 12 in which said multi-bit counting circuit is a free-running counting circuit that counts from an initial count to a final count during each basic time interval, said correlating circuit means comprises comparison means for comparing the multi-bit value latched in said multi-bit latching memory circuit to the value of the count of said free-running counting circuit, and said modulating circuit means comprises pulse width modulating means for applying to said circuit that contains the movement of said gauge, a pulse width modulated current whose pulse width is determined by the occurrence of said predetermined correlation of the multi-bit value latched in said latching memory circuit to the counting of said free-running counting circuit.

14. The improvement set forth in claim 12 in which said gauge further comprises an indicator that is independent of said movement and operated by a particular bit of said multi-bit latching memory circuit to give an indication that the value of the parameter of interest is outside the span of said movement.

15. The improvement set forth in claim 12 in which said correlating circuit means comprises means for comparing the count of said counting circuit to the multi-bit value latched in said latching memory circuit during each basic time interval, and said modulating circuit means comprises a bi-stable circuit that is operated during each basic time interval to one stable state during a portion of such interval prior to the occurrence of said predetermined correlation of the multi-bit value latched in said latching memory circuit to the counting of said counting circuit and to the other stable state during a portion of such interval subsequent to the occurrence of said predetermined correlation.

16. The improvement set forth in claim 15 in which said bi-stable circuit applies to said circuit that contains the movement of said gauge a pulse width modulated current whose on and off times are established by the respective portions of the basic time interval prior and subsequent to the occurrence of said predetermined correlation, and said multi-bit counting circuit is a free-running counting circuit that serves to define the basic time interval as the time required to count from an initial count to a final count and with each immediately succeeding basic time interval beginning by said free-running counting circuit reverting to its initial count on the count immediately following the final count of the immediately preceding interval.

17. The improvement set forth in claim 12 in which the indicator gauge contains axially spaced apart front and rear panels, said multi-bit latching memory circuit, said timing circuit means, said correlating circuit means and said modulating circuit means are disposed on said rear panel in electrical circuit relationship, and said movement operates an indicating needle that is disposed in front of said front panel.

18. The improvement set forth in claim 17 in which said multi-bit counting circuit is a free-running counting circuit that counts from an initial count to a final count during each basic time interval, said correlating circuit means comprises comparison means for comparing the multi-bit value latched in said multi-bit latching memory circuit to the value of the count of said free-running counting circuit, and said modulating circuit means comprises pulse width modulating means for applying to said circuit that contains the movement of said gauge, a pulse width modulated current whose pulse width is determined by the occurrence of said predetermined correlation of the multi-bit value latched in said latching memory circuit to the counting of said free-running counting circuit.

19. In an indicator gauge that has an indicator that is operated by a signal to cause the gauge to indicate the value of said signal, a circuit for developing said signal comprising:
  a. a multi-bit latching memory circuit for latching multi-bit data that designates the value of said signal;
  b. timing means for periodically generating a basic time interval comprising a multi-bit counting circuit;
  c. correlating circuit means having inputs connected to said multi-bit latching memory circuit and to said timing means and comprising means for correlating the value of the multi-bit data latched in said latching memory circuit with the counting by said multi-bit counting circuit during each basic time interval, said correlating circuit means having an output; and
  d. modulating circuit means having an input connected to the output of said correlating circuit means and comprising means for modulating a circuit that operates the indicator in accordance with the occurrence of a predetermined correlation, as determined by said correlating circuit means, of the value of the multi-bit data latched in said multi-bit latching memory circuit with the counting of said counting circuit during each basic time interval to cause the gauge indicator to indicate the value of the multi-bit data work latched in said latching memory circuit.

20. The improvement set forth in claim 19 in which said multi-bit counting circuit is a free-running counting circuit that counts from an initial count to a final count during each basic time interval, said correlating circuit means comprises comparison means for comparing the multi-bit value latched in said multi-bit latching memory circuit to the value of the count of said free-running counting circuit, and said modulating circuit means comprises pulse width modulating means for applying to the circuit that operates the gauge indicator, a pulse width modulated current whose pulse width is determined by the occurrence of said predetermined correlation of the multi-bit value latched in said latching memory circuit to the counting of said free-running counting circuit.

21. The improvement set forth in claim 19 in which said multi-bit latching memory circuit, said timing circuit means, said correlating circuit means and said modulating circuit means are disposed on an electric circuit board panel in electrical circuit relationship, and said panel is adapted for cooperative association with another panel on whose face the gauge indicator is disposed.

22. The improvement set forth in claim 19 in which said correlating circuit means comprises means for comparing the count of said counting circuit to the multi-bit value latched in said latching memory circuit during each basic time interval, and said modulating circuit means comprises a bi-stable circuit that is operated during each basic time interval to one stable state during a portion of such interval prior to the occurrence of said predetermined correlation of the multi-bit value latched in said latching memory circuit to the counting of said counting circuit and to the other stable state during a portion of such interval subsequent to the occurrence of said predetermined correlation.

23. The improvement set forth in claim 22 in which said bi-stable circuit applies to the circuit that operates the gauge indicator, a pulse width modulated current whose on and off times are established by the respective portions of the basic time interval prior and subsequent to the occurrence of said predetermined correlation, and said multi-bit counting circuit is a free-running counting circuit that serves to define the basic time interval as the time required to count from an initial count to a final count and with each immediately succeeding basic time interval beginning by said free-running counting circuit reverting to its initial count on the count immediately following the final count of the immediately preceding interval.

* * * * *